Feb. 7, 1956 F. KREIS 2,733,614
AUTOMATICALLY OPERATING CHANGE SPEED GEAR
Filed March 2, 1951 2 Sheets-Sheet 1

INVENTOR.
BY FRITZ KREIS

Feb. 7, 1956  F. KREIS  2,733,614
AUTOMATICALLY OPERATING CHANGE SPEED GEAR
Filed March 2, 1951  2 Sheets-Sheet 2
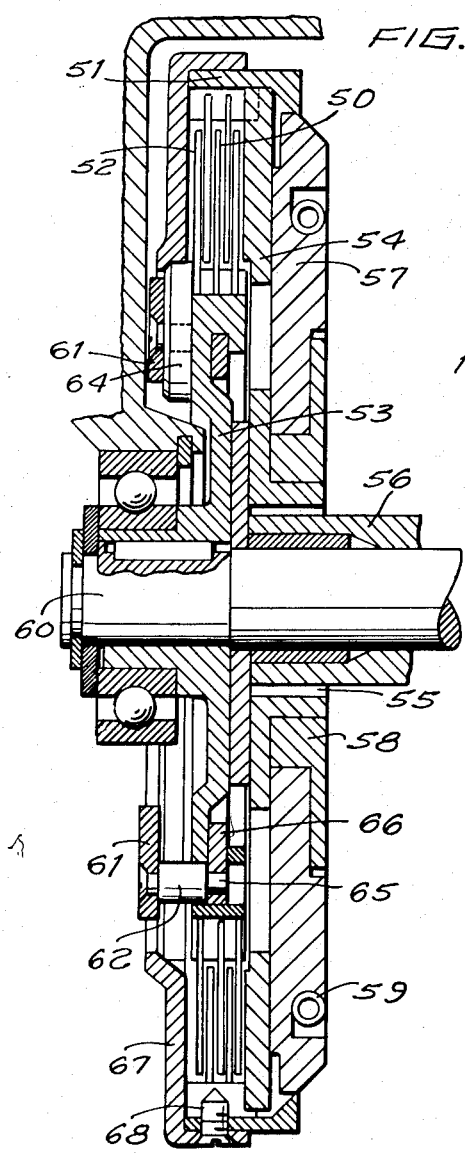
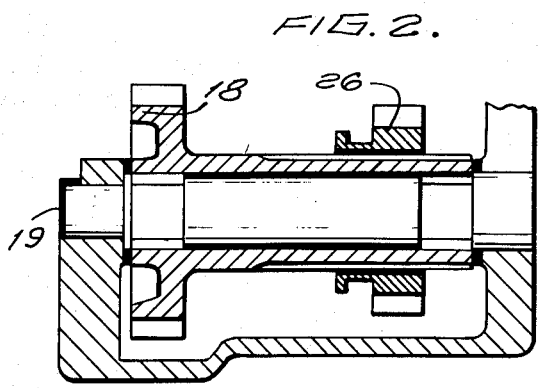
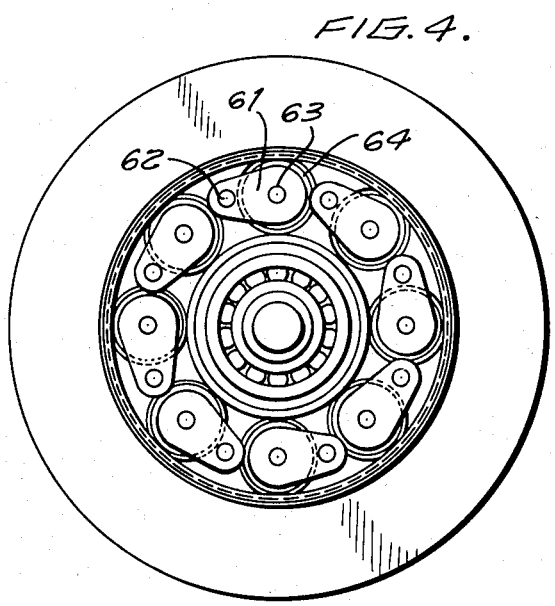
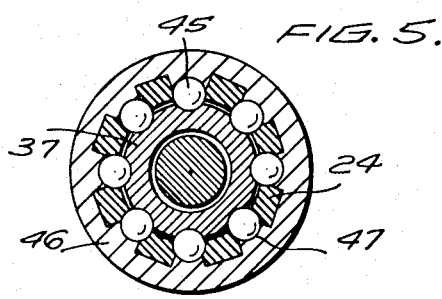
INVENTOR.
FRITZ KREIS
BY

United States Patent Office 2,733,614
Patented Feb. 7, 1956

2,733,614

AUTOMATICALLY OPERATING CHANGE SPEED GEAR

Fritz Kreis, Wurzburg, Germany

Application March 2, 1951, Serial No. 213,542

6 Claims. (Cl. 74—336)

This invention relates to automatically operating change speed gears, specially for motor vehicles, wherein a centrifugal clutch is located between the engine and each drive, and each of the drives below the highest one has at least one free wheel clutch which allows an overrunning action in this drive when the subsequent one is engaged.

With such speed change gears, the subdivision is already known of the speeds lying below the direct drive into two step-down groups, i. e. one with a greater ratio for driving in hilly country and another for driving in level country. In both cases the gear can operate quite satisfactory and shift automatically to the direct drive.

In some cases it is desiderable that this action should not take place automatically and that the delaying of the automatic shift should be left to the driver's own judgment when a given number of revolutions is exceeded. It is one of the objects of this invention to make this possible.

According to the present invention, the shifting movement in the clutch i. e. the motion of the centrifugal weights which bring about the coupling is opposed by locking elements operating under the action of additional centrifugal weights, which, in turn, are supported on the part of the clutch coupling which is connected with the engine. These locking elements consist of a ring having a U-shaped section which with its bridge can be displaced axially on the driving shaft its extremities being fitted with wedge shaped elements, which engage in correspondingly bevelled recesses back in the additional centrifugal weights and in the centrifugal weights which cause engagement of the drive couplings.

Of substantial importance is the fact that the ring carrying the locking elements and having a U-shaped section, is cut near the hub and the two bridges (which have a disc-like shape) are sustained against each other through the insertion of thrust bearings.

According to a feature of the invention, a free wheel mechanism is also inserted into each of the gear drive stages lying below the highest one, permitting in such stages an overrunning action when the next above one is operating, more especially in connection with a backwardly acting locking device working as a so called hillhelp where the main gear shaft within the gear itself possesses a dividing zone and where the shaft parts that can be separated are inserted within each other within the extent of the dividing zone and are connected together at that zone through an easily disconnectable ball coupling.

In order to attain this object the parts inserted within each other in the area of the dividing zone have an internal portion for receiving balls which rotate with same and which engage in correspondingly sized radial recesses in the external shaft portion: the balls being retained in position by means of a sleeve sliding on the outer shaft part.

Instead of the specially shaped additional centrifugal weights with their bevelled recesses and co-operating locking elements the additional centrifugal weights may, according to an alternative form of the invention, be replaced by rollers, which are rotatably carried by levers hinged to the driving joint portion and which in the outwardly swung position engage the inside rim of a disc ring, the latter being connected with the portion of the driven half coupling which is movable in an axial direction through the action of the centrifugal weights used for the coupling operation or shifting. Advantageously both the inside rim of the disc shaped ring and the edges of the centrifugal weight rollers with which it makes contact are suitably bevelled.

The above mentioned disc ring is shaped in such a way as to act as a backing or abutment for the coupling discs.

The invention is more particularly described with reference to the accompanying drawings which illustrate by way of example one form of the improved change speed gear.

In these drawings:

Figure 2 is a part section of the construction according to Figure 1.

Figure 3 is a longitudinal section through a portion of another embodiment.

Figure 4 is an end elevation to Figure 3 and

Figure 5 is a section through the ball joint of the shaft with the dividing zone.

Figure 1:
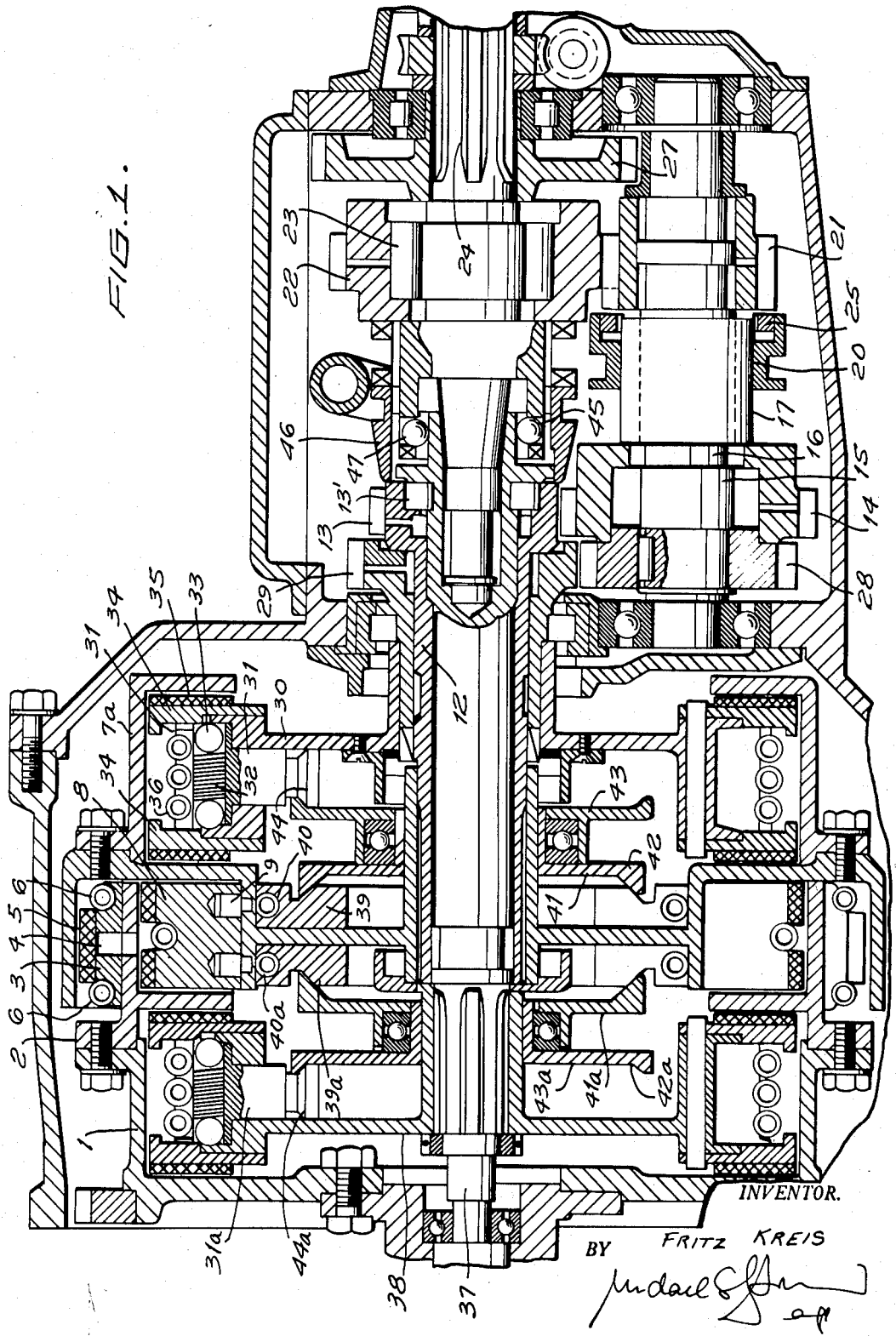
Figure 1 is a longitudinal section of a complete speed change gear.

In the example illustrated in Figures 1 and 2 of one embodiment of the invention, 1 indicates the disc flywheel of the engine to which drum 2 is connected as a weight carrier. On this drum, a number of weight sectors 3 are arranged as rings. These weight sectors can move outwardly under the action of centrifugal forces, which also operate engaging bolts 4. Each of the weight sectors is fitted with a clutch lining 5. Two endless tie springs 6 together hold back the centrifugal weights until a given revolutional speed is reached.

After the centrifugal weights press against the engaging drum 7 (which action takes place after a given revolutional speed has been exceeded) drum 7 is also put in turn upon the centrifugal weights 8, which are also arranged in such a way as to be radially movable in an outward direction by means of engaging bolts 9.

Clutch lining 10 is fastened to the outer surface of centrifugal weights 8. A tie spring 11 holds back these centrifugal weights 8 also, until a given revolutional speed is reached.

The centrifugal weights 3 and the centrifugal weights 8 effect consecutively coupling between drums 1 and 7, in other words centrifugal weights 3 and 8 serve the same purpose. The purpose of this arrangement is to attain a desirable higher coupling pressure at higher revolution speeds, while at the beginning of the coupling action a slipping of the clutch is permitted.

Hollow shaft 12 and gear wheel 13 are also rotatable with drum 7 and the toothed wheel 13 engages with gear wheel 14. Gear wheel 14 in turn engages a free wheel mechanism 15 and causes revolution of the shaft 16 also.

Shaft 16 has a pinion 17 which is engaged by the gear wheel 18 (Figure 2) of a secondary shaft 19 such secondary shaft being arranged parallel with shaft 16.

A sliding sleeve 20 is arranged on the shaft 16, and is guided on pinion 17. A gear wheel 21 is fitted loosely on the shaft 16 and engages with a gear wheel 22, on the main shaft.

This gear wheel 22 engages likewise with a free wheel mechanism 23 and causes the driven shaft 24 to be engaged. Gear wheel 21 in the position indicated in the drawing is not in the line of drive. Only when the sleeve 20 is shifted to the right does the internal gearing 25 of sleeve 20 engage with the external gear ring of gear wheel 21, whereby power is transmitted from shaft 16 through gear wheel 21 to gear wheel 22.

A second gear wheel 26 is fitted on secondary shaft 19 (Figure 2), this gear wheel being secured against rotation relative to gear 18, but axially displaceable. In the position indicated in the drawing, the wheel 26 is in the free wheel position and is between gear wheel 21 and back motion wheel 27. The latter is firmly connected to driven shaft 24. Further a gear wheel 28, engaging gear wheel 29, is fitted on the countershaft and is firmly connected to it. Clutch carrier 30 is firmly connected to gear wheel 29.

Centrifugal weights 31 likewise arranged as sectors, come to rest against clutch carrier 30. Each of these centrifugal weights has a part jutting downwards in the shape of a peg, so as to ensure that the centrifugal weights engage in corresponding bores. Coil springs 32 are contained in cross bores in the rectangular upper portion of each centrifugal weight, such springs unloading their tension to pressure plates 34 through balls 33 when the centrifugal weights are tending to move outwards. Ring shaped joint linings 35 are fitted laterally on the outside of the pressure plates 34 and are suitably fastened. Three tie springs 36 together hold back the centrifugal weights until a given revolutional speed is reached.

Clutch carrier 38 is fitted on the end of the driving shaft nearest the engine and includes a similar set of clutch parts as described above in connection with carrier 30.

These clutch parts bring about at the given moment the insertion of the direct drive or direct stage of the gear.

In order that the lower drive stages may be operated the centrifugal weights 31 and 31a of the last and last but one drive stage are opposed by a resistance which is originated by centrifugal forces. To this effect, smaller centrifugal weight rings 39 and 39a are fitted in the engaging drum 7.

Tie springs 40 and 40a prevent these centrifugal weights 39 and 39a from becoming effective too early. Axially movable discs 41 and 41a engage in notch like recesses in the centrifugal sectors 39 and 39a. To this end the said discs include projecting elements 42 and 42a which tend to move the centrifugal weight sectors 39 and 39a inwardly against their centrifugal action.

Discs 41 and 41a displace themselves together with the adjacent discs 43 and 43a through a thrust bearing fitted between them. Discs 43 and 43a are likewise equipped with such beads, which in turn engage into notch like recesses 44 and 44a of centrifugal weights 31 and 31a.

In the speed change gear just described and illustrated, a centrifugal clutch is located between the speed change gear stages and the engine, for selecting the various speeds. A free wheel mechanism is moreover fitted in each in each of the gear stages below the highest one, which allows an overrunning action in such stage during operation with the stage lying next above it, and, furthermore, also a locking device is foreseen, operating as a so-called hillhelp.

In such a gear as just described, difficulty may be experienced in putting the gear in the so-called lock position when going up a hill in consequence of the pressure exerted by the gear wheels. Such difficulty is easily overcome due to the fact that the main shaft within the gear assembly can be divided by means of a coupling that can be easily disconnected. In order to attain this the construction is that the parts that can be divided and inserted one into the other at the dividing zone, balls being fitted on the internal part of the shaft. These balls rotate with the parts and engage with the correspondingly sized radial bores or recesses of the outer shaft portion, such balls being prevented from falling out in the coupling position by a sliding sleeve fitted on the outer shaft portion.

As can be seen from the drawing, driving power from the engine acts on disc-flywheel 1 and drum 2 connected to it. As already described above, driving power reaches gear wheels 13, 14 and from this gear train is taken through gear wheels 21, 22 and to the driven shaft 24. Free wheels 13 and 15 are mounted in toothed wheels 14 and 22 and slip into lock position in case of operation in the already described first drive stage.

After centrifugal weights have moved towards the outside, centrifugal weights fitted on the driven half of clutch 7 will deflect (when the latter has reached a given revolutional speed), in conjunction with driving clutch half or drum 2, so that a particularly strong coupling action will be guaranteed.

In the second drive stage, the drive goes from drum 7 to the driven shaft, through coupling 34, which is thrown in backwards due to action coming from the gear, and through gear wheels 28, 29, 21 and 22.

At this stage, free wheel 15 becomes disconnected from gear wheel 14, because the secondary shaft 16, which is now driven faster by gear wheels 28, 29, is advanced compared with gear wheel 14. In the third or direct drive stage, the driving shaft 37 is connected directly to the disc-flywheel 1 by means of the clutch 31a.

The free wheel 13', acting as a hill-help is fitted on gear wheel 13 and is brought in lock position in case the vehicle should tend to move backwards when going up a hill.

In order that the gear may now be easily engaged in the free wheel or backward drive, the ball joint is put in action.

If the sleeve 46 is displaced in a right hand direction, the balls can move outwardly. The displacement of sleeve 46 is also possible in the lock position of free wheel 13', because only the friction of the force which is delivered by pressure balls to the sleeve must be overcome. If the latter is again displaced in a left hand direction, the balls are once more pushed towards the inside into the recesses 48 of shaft portion 38, under the action of the wedge shaped guides 47 of sleeve 46, such guides being turned towards the inside, and the coupling is again affected. In the embodiment of clutch lock device which is shown in Figures 3 and 4, the gearing (projecting outwardly) of the ribs 50 belonging to one clutch half engages within the internal gearing of external body 51, while the ribs 52 belonging to the other joint half rest upon a rib carrier 53 with their toothed gearing jutting towards the inside.

Engaging disc 53 engages, by means of its external toothed gearing with the internal toothed gearing of external body 51 and is firmly connected to hollow shaft 56 through a slot 55 within the hub of the above mentioned engaging disc.

Shaft 56 receives its drive from the speed change gear in a backward direction through the toothed wheel step belonging to the clutch with correspondingly stepped down revolutional speed, when the vehicle is running in one of the lower drives. Centrifugal weights 57, arranged as sectors and in the form of rings are fitted on engaging disc 54 and rotate with it. They are fitted and guided on the engaging disc in such a way as to be able to slide radially and are prevented from coming out laterally by limiting ring 58.

Tie spring 59 having the shape of an endless tension spring, holds the centrifugal weights together or back until a given revolutional speed is attained.

Rib carrier 53 seats firmly on engine driven shaft 60 by means of a wedge. Shackles 61 (Figure 3) are suspended laterally to rib carrier 53 and can rotate with one end around bolt 62; at their other end they carry centrifugal weight rollers 64 which can rotate around bolt 63.

In order to prevent lateral displacement, bolts 62 have a ring shaped groove 66 into which a clipring 66 engages. Centrifugal weight rollers 64 are bevelled towards the outside on their outer circumference with a given angle and lay themselves (when moving outwards) against the inside edge of the clutch back 67, which also presents a conical shape.

Clutch back 67 is also in firm connection with outer body 51 by means of screws 68. The centrifugal weights are bevelled with a given angle on their external circumference and engage with this bevel behind the corresponding bevelled internal edge of outer body 51.

What I claim is:

1. In an automatic transmission mechanism, in combination, drive means including a drive shaft; driven means; at least one clutch means for connecting said drive means with said driven means; rotary clutch-actuating means effecting engagement of said clutch means at a predetermined revolution speed and including radially movable members adapted to move outwardly due to the action of centrifugal force, each of said members formed with a bevelled recess; centrifugal weight means, each of said weight means formed with a bevelled recess facing said bevelled recesses in said radially movable members; and locking means mounted on said drive shaft movably in axial direction thereof and provided with two circular wedge-shaped projections facing in opposite axial directions, one of said wedge-shaped projections engaging said bevelled recesses in said centrifugal weight means, and the other of said wedge-shaped projections engaging said bevelled recesses in said radially movable members so that said one of said wedge-shaped projections is forced out of said bevelled recesses in said centrifugal weight means when the same move outwardly due to centrifugal force and said locking means is urged toward said radially movable members whereby said other wedge-shaped projection engages said bevelled recesses in said radially movable members and retains said clutch-actuating means.

2. In an automatic transmission mechanism, in combination, drive means including a drive shaft; driven means; at least one clutch means for connecting said drive means with said driven means; rotary clutch-actuating means effecting engagement of said clutch means at a predetermined revolution speed and including radially movable members adapted to move outwardly due to the action of centrifugal force, each of said members formed with a bevelled recess; centrifugal weight means, each of said weight means formed with a bevelled recess facing said bevelled recesses in said radially movable members; and locking means including two disc-shaped members and a hub intermediate said disc-shaped members, said locking means being mounted on said drive shaft movably in axial direction thereof and provided with two circular wedge-shaped projections facing in opposite axial directions, one on each disc-shaped member, one of said wedge-shaped projections engaging said bevelled recesses in said centrifugal weight means, and the other of said wedge-shaped projections engaging said bevelled recesses in said radially movable members so that said one of said wedge-shaped projections is forced out of said bevelled recesses in said centrifugal weight means when the same move outwardly due to centrifugal force and said locking means is urged toward said radially movable members whereby said other wedge-shaped projection engages said bevelled recesses in said radially movable members and retains said clutch-actuating means.

3. In an automatic transmission mechanism, in combination, drive means including a drive shaft; driven means; at least one clutch means for connecting said drive means with said driven means; rotary clutch-actuating means effecting engagement of said clutch means at a predetermined revolution speed and including radially movable members adapted to move outwardly due to the action of centrifugal force, each of said members formed with a bevelled recess; centrifugal weight means, each of said weight means formed with a bevelled recess facing said bevelled recesses in said radially movable members; and locking means mounted on said drive shaft movably in axial direction thereof, said locking means including two disc-shaped members and a hub-shaped thrust bearing located on said drive shaft intermediate said disc-shaped members, each of said disc-shaped members provided with a circular wedge-shaped projection, said circular wedge-shaped projections facing in opposite axial directions, one of said wedge-shaped projections engaging said bevelled recesses in said centrifugal weight means, and the other of said wedge-shaped projections engaging said bevelled recesses in said radially movable members so that said one of said wedge-shaped projections is forced out of said bevelled recesses in said centrifugal weight means when the same move outwardly due to centrifugal force and said locking means is urged toward said radially movable members whereby said other wedge-shaped projection engages said bevelled recesses in said radially movable members and retains said clutch-actuating means.

4. In an automatic transmission mechanism, in combination, drive means including a drive shaft; driven means; a main shaft consisting of two coaxial separate main shaft portions, one of said main shaft portions having a hollow end portion formed with radially extending bores and surrounding the end portion of the other of said main shaft portions, said latter end portion being formed with recesses located under said bores; a plurality of change speed gears for rotating said driven means at different speeds, said change speed gears being mounted on said main shaft; centrifugal clutch means for effecting connection between said drive means and each of said change speed gear means; a plurality of free wheel clutches, each of said free wheel clutches operatively connected with one of said change speed gear means so as to permit an overrunning action when the next higher change speed gear is operating; and coupling means for connecting said coaxial separate main shaft portions to each other, said coupling means including balls located in said radially extending bores in said one of said main shaft portions and in coupling position engaging said recesses in said end portion of said other main shaft portion, and further including sleeve means axially movably mounted on said end portion of said one main shaft portion and adapted to engage said balls and to move the same into coupling position.

5. A coupling device, comprising in combination, a rotary driving member; a rotary driven member; centrifugal weights mounted on said rotary driven member movably in radial direction, each weight having a bevelled edge; an annular member having a bevelled inner flange adapted to be engaged by said bevelled edges of said centrifugal weights; a plurality of arms pivotally mounted at one end thereof on said driving member; and a plurality of rollers rotatably mounted on the other end of said arms so that said rollers when urged outwardly by the action of the centrifugal force during rotation of said driving member cause said arms to pivot so that said rollers engage said annular member.

6. A coupling device according to claim 5 wherein the mutually engaging edge portion of said rollers and of said annular member are bevelled.

References Cited in the file of this patent

UNITED STATES PATENTS

| 1,917,501 | Cotterman | July 11, 1933 |
| 2,108,105 | Cotterman | Feb. 15, 1938 |
| 2,134,316 | Rauen et al. | Oct. 25, 1938 |
| 2,218,530 | Hall et al. | Oct. 22, 1940 |
| 2,432,077 | Segard | Dec. 2, 1947 |
| 2,534,134 | Kirkpatrick | Dec. 12, 1950 |

FOREIGN PATENTS

| 808,774 | France | Nov. 24, 1936 |